Nov. 28, 1961 T. COE ET AL 3,010,863

METHOD OF MANUFACTURING ELECTRICALLY INSULATING PANELS HAVING A CONDUCTIVE PATTERN AND PANEL MANUFACTURED BY SUCH METHOD

Filed June 3, 1958

INVENTORS
THOMAS COE
REIN BAKKER

BY Frank R. Trifari
AGENT

United States Patent Office 3,010,863
Patented Nov. 28, 1961

3,010,863

METHOD OF MANUFACTURING ELECTRICALLY INSULATING PANELS HAVING A CONDUCTIVE PATTERN AND PANEL MANUFACTURED BY SUCH METHOD

Thomas Coe and Rein Bakker, Eindhoven, Netherlands, assignors to North American Philips Company, Inc., New York, N.Y., a corporation of Delaware Filed June 3, 1958, Ser. No. 739,574
Claims priority, application Netherlands June 7, 1957
5 Claims. (Cl. 156—3)

Figures 1, 2, 3, 4, 5, 6:
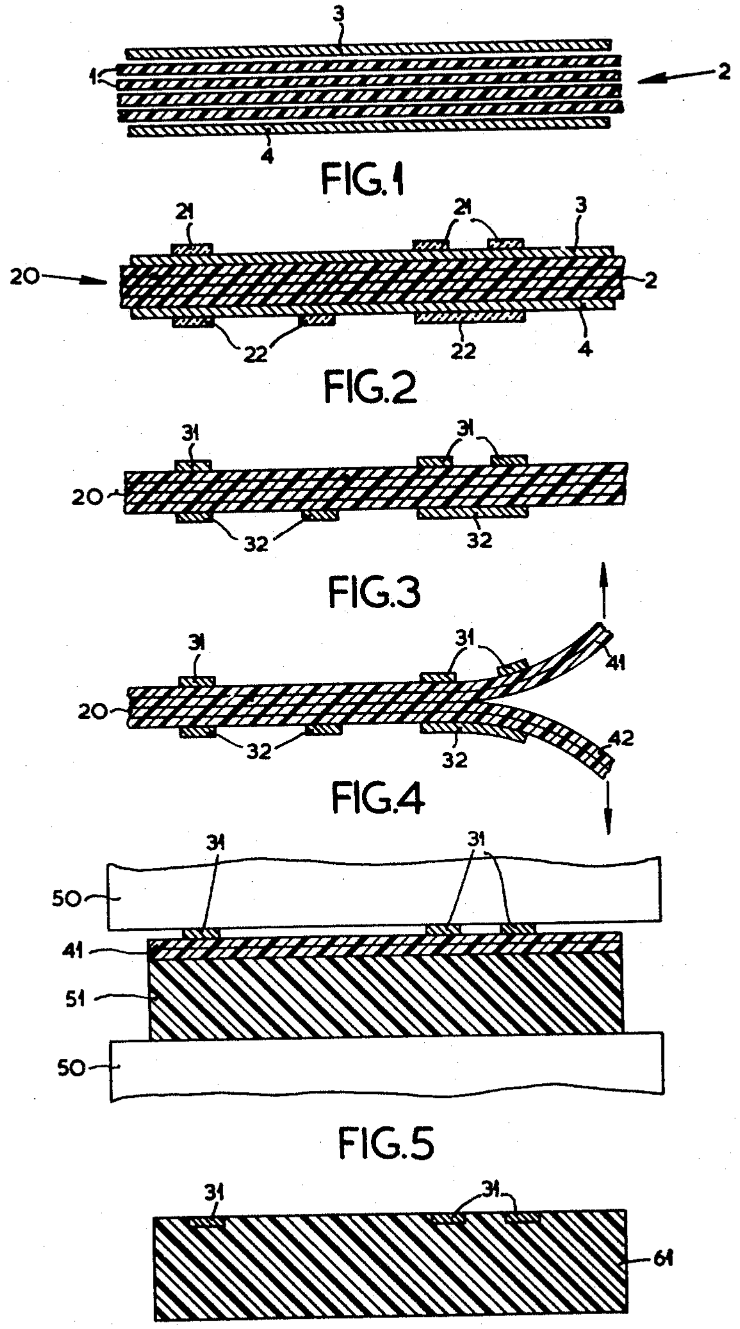

This invention relates to methods of manufacturing electrically insulating panels having an electrically conductive pattern at least on one side. In these methods an insulating layer containing a thermosetting synthetic resin hardened only in part is provided on each side with a metal layer, parts of which in the form of the conductive pattern desired, are covered with a protective layer, the parts which are not covered being removed with the use of a liquid dissolving the metal or removing it by etching. The invention also relates to panels manufactured by such methods.

In the manufacture of wireless and television apparatus and also many other electronic apparatus such, for example, as computers, nowadays use is frequently made of insulating panels having an electrically conductive pattern, preferably of metal, on or flush with their surface. Parts of this pattern form the electrical connections between electric component parts to be secured to the panel. Such panels are known under the name "printed wiring," which designation does not mean, however, a limitation to the use of only processes in the manufacture of such panels which are known from the printing technique.

In a known method of manufacturing such panels of the kind mentioned in the preamble, after the non-covered parts of the metal layer have been removed, the remaining pattern is pressed into the insulating layer by the use of heat and pressure, the synthetic resin in this layer being completely hardened during this process. This known method has the disadvantage that the whole panel comes into contact with the liquid of the bath by means of which the non-covered parts of the metal layer are removed, so that the panel, which constitutes the ultimate support for the conductive pattern, can absorb such liquid. This may result in a decrease of the insulating properties of the panel and a resultant in corrosion of the conductive pattern. Said disadvantage becomes manifest more particularly if, prior to the removal of the non-covered parts of the metal layer, the panel is subjected to the action of other active liquids, for example if the protective layer is produced in a known manner by photographic means with the use of a light-sensitive layer. The treatments then may lead to the partly hardened synthetic resin in the panel being increasingly sensitive to contact with the liquid of the bath in which the non-covered parts of the metal layer are removed.

The invention underlies recognition of the fact that these disadvantages may be substantially avoided if the insulating panel constituting the ultimate support for the conductive pattern is completely built up only after the treatment in said metal dissolving bath and contact between the liquid of the bath and the panel is avoided.

The method according to the invention is characterized in that the insulating layer, which consists of a small number, but at least two sheets, of paper impregnated with a thermo-setting synthetic resin, after removal of the non-covered parts of the metal layers, is divided in a plane parallel to its surface into two separate insulating layers each having a conductive pattern on one side, whereafter at least one of said layer is joined to an insulating substratum in a heated press. During this process, the conductive pattern is pressed into the insulating layer and the thermo-setting resin therein is completely hardened.

In order that the invention may be readily carried into effect, one embodiment will now be described in detail, by way of example, with reference to the accompanying drawing.

FIGS. 1 to 5 are cross-sectional views of an insulating layer having a metal layer or metal pattern provided thereon in consecutive stages of treatment, and FIG. 6 is a cross-sectional view of the panel obtained by the method chosen by way of example.

Several sheets of paper 1, for example four, impregnated with thermo-setting synthetic resin, are stacked so as to form a stack 2, whereafter metal foils 3 and 4 respectively, for example of copper, are laid on each side of the stack 2 (FIG. 1). The thermo-setting synthetic resin may consist, for example, of a phenol-formaldehyde or a cresol-formaldehyde condensate. The metal foils 3 and 4 each have a thickness between $20\mu$ and $80\mu$. A material other than copper may be chosen for these foils, for example aluminum. Before being laid on the stack 2, the metal foils 3 and 4 are preferably provided, on the side toward the stack, with an adhesive layer consisting of a thermo-setting resin combination. A combination of a butadiene-acrylonitrile copolymer and a phenol-aldehyde condensate is very suitable for such an adhesive layer. However, it is also possible to utilize condensates of melamine and formaldehyde or epoxy resins for the adhesive layer.

The stack 2, the various layers of which in FIG. 1 are shown each individually for the sake of clarity, and the metal foils 3 and 4 on each side thereof are pressed in a press heated at 115° C. to 120° C. for about 10 minutes. During this process, the synthetic resin is partially hardened and adhesion between the stack 2 and the copper foils 3 and 4 is obtained so as to form a coherent assembly which can be conveniently handled.

Subsequently, etching resists 21 and 22, respectively in the positive of the conductive pattern to be obtained (FIG. 2) is provided on each of the metal foils 3 and 4 of the plate 20 formed from the stack 2. This may be effected by printing the etching resist in known manner by means of a silk-screen stencil directly onto the surface of the metal foil concerned. For detailed patterns, the etching resist is preferably provided by photographic means, the whole surface of the relevant metal foil then first being covered with a layer of a light-hardenable material, for example a layer of polyvinyl butyral sensitized by a bichromate, subsequently this light-sensitive layer being illuminated with actinic light in conformity with the conductive pattern to be obtained, and then the non-illuminated parts of the layer being dissolved or removed by washing.

The stratified plate 20 provided with etching resist is subsequently dipped in an etching bath, in which the parts of the metal foils 3 and 4 which are not covered with the etching resist 21 and 22, respectively are dissolved. The bath may consist, for example, of a solution of ferrichloride. After etching, the plate is rinsed and the etching resist on each side of the plate is removed by alcoholic hydrochloric acid, resulting in an insulating plate 20 having on each side a conductive pattern formed by the remaining parts 31 and 32, respectively, of the initial foils 3 and 4 (FIG. 3).

It is not always necessary to remove the etching resist after etching. In many cases, the resist may be left intact, more particularly if connecting wires can be soldered afterwards to the conductive pattern through the etching resist.

After rinsing and drying, the plate 20 is divided parallel to its plane by pulling one or more of the paper sheets away from the others (FIG. 4), thus resulting in two separate insulating layers 41 and 42 each consisting of at least one sheet of paper containing partially hardened thermo-setting synthetic resin and each having a metal pattern 31 and 32, respectively, adhered to one side thereof.

One of these layers, for example the layer 41, after a marginal portion has been cut off all around, is laid on an insulating plate 51 which may consist, for example, of a thermo-setting synthetic resin already completely cured or only partly cured and which may also contain a number of paper layers. The resultant stack is placed in a press 50 (FIG. 5) and pressed while being heated, the metal pattern 31 thus being sunk into the layer 41 and at the same time the synthetic resin in this layer 41 is fully cured. During the process, an adhering junction between the layer 41 and the plate 51 is also established. If the latter at first contains synthetic resin only partly cured, the synthetic resin therein is at the same time also fully cured.

From the press 50 thus emerges an insulating panel 61 (FIG. 6), which is fully cured and which has a conductive pattern 31 countersunk in its surface.

The layer 42 may be united in a similar manner with another plate 51.

It will be evident that the plate 51 to be placed in the press 50 may be provided on each side with an insulating layer obtained by division of a plate 20 and having a conductive pattern thereon. Thus, for example, the layer 41 may be placed above and the layer 42 below said plate 51. The panel obtained by pressing then has a conductive pattern countersunk in its surface on each side. These patterns are usually not identical.

The insulating layer 41 may be fixed on the plate 51, so that the conductive pattern 31, is adjacent to the plate 51 instead of being remote therefrom. This affords the advantage that the pattern is completely enclosed in the panel obtained after pressing and hence fully protected. However, in this case, it is more difficult to establish electrical connections to the pattern, which may then be effected, for example, through holes to be provided in the panel.

The number of sheets of paper in the stack 2, with which the method above described, is started, is at least two in view of the division to be affected afterwards and is chosen to be as small as possible.

In order that, during the last pressing treatment, the pattern may be countersunk in the insulating layers 41 and 42, respectively, the minimum thickness to be used for the stack 2 is dependent upon the thickness of the metal foils 3 and 4 employed. When use is made of thinner metal foils, a smaller thickness of the stack 2 suffices. Normally, it is sufficient to use from four to six sheets of paper having a weight per sheet of 90 grams per square metre, which amounts to a thickness of about 150 microns per sheet.

The invention permits of manufacturing the panel substantially of ceramic or other insulating material which need not undergo any deformation in the press. In this case, the plate 51 is required to consist of the material concerned.

The small thickness and the corresponding flexibility of the thin insulating layers 41 and 42 obtained after division with a metal pattern thereon allows the manufacturing of panels having a shape different from the flat plane. The insulating layer or layers may, for example, together with a substratum 51 likewise deformable, be compressed and hardened out in a press of a special form, for example a semi-cylindrical form. However, the substratum 51 may alternatively consist of substantially non-deformable material, but must then have beforehand the desired shape differing from the flat plane, which shape is also assumed in the press by the insulating layer 41 and/or 42 with the metal pattern provided thereon. It will be evident that in the latter case the press must also be matched to the relevant shape of the substratum.

In the embodiment described above, the conductive pattern is formed by the parts of a metal foil remaining after etching. However, the pattern may alternatively be obtained in a different way, for example instead of applying a metal foil to each side of the stack 2, by providing the upper and lower sheets of the stack, by chemical means, with a thin metal layer, for example of silver. A different metal, for example copper, is then caused to grow by electro-deposition on the parts of these layers corresponding to the desired pattern, whereafter those parts of the initial metal layers on which no metal has grown, are either removed by etching or converted by chemical means into a soluble compound which subsequently is dissolved.

What is claimed is:

1. A process of manufacturing an electrically insulating panel containing at least on one side an electrically conductive pattern, comprising the steps of stacking a small number, but at least two, of sheets of paper impregnated with a heat-curable thermosetting resin, applying by means of a heat-curable adhesive layer a metallic coating to each side of said stack, subjecting said stack with metallic coatings to a first pressing and heating operation, whereby said curable adhesive layer underneath said metallic coatings is wholly cured and said thermosetting resin in said paper sheets is only partly cured, applying an etching resist in the positive of the desired conductive pattern to each metallic coating of the composite structure obtained by said first pressing and heating operation, removing the parts of said metallic coatings not covered by said resist by an etching treatment, dividing said composite structure in a plane parallel to its surface in two separate insulating layers, each of said insulating layers having a conductive pattern on one side only thereof, applying at least one of these layers to an insulating substratum and subjecting said layer and said substratum to a second pressing and heating operation, whereby the conductive pattern on said insulating layer is pressed into said insulating layer, said insulating layer and said substratum are united in a unitary structure and said partially cured thermosetting resin in said insulating layer is fully cured.

2. The method of claim 1 in which the insulating substratum consists of layers of paper impregnated with a partially cured thermosetting resin, which resin is fully cured during the heat and pressure step.

3. The method of claim 1 in which the electroconductive pattern is positioned so as to be out of contact with the insulating substratum.

4. The method of claim 1 in which the electroconductive pattern is positioned so as to be in contact with the insulating substratum.

5. The method of claim 1 in which the insulating layer and insulating substratum are curved and the resultant insulating panel is similarly curved.

References Cited in the file of this patent

UNITED STATES PATENTS

| | | |
|---|---|---|
| 1,284,296 | Frederick | Nov. 12, 1918 |
| 2,448,357 | Craig et al. | Aug. 31, 1948 |
| 2,587,171 | Knewstubb et al. | Feb. 26, 1952 |
| 2,683,839 | Beck | July 13, 1954 |
| 2,692,190 | Pritikin | Oct. 19, 1954 |
| 2,716,268 | Steigerwalt | Aug. 30, 1955 |
| 2,849,298 | Werberig | Aug. 26, 1958 |

FOREIGN PATENTS

| | | |
|---|---|---|
| 728,219 | Great Britain | Apr. 13, 1955 |